(12) United States Patent
Ueda et al.

(10) Patent No.: US 7,342,997 B2
(45) Date of Patent: Mar. 11, 2008

(54) METHOD FOR MEASURING DEAD TIME OF X-RAY DETECTOR

(75) Inventors: Tomoyasu Ueda, Hamura (JP); Yoshiyasu Ito, Tachikawa (JP); Kazuhiko Omote, Akiruno (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 11/435,237

(22) Filed: May 16, 2006

(65) Prior Publication Data

US 2006/0285642 A1    Dec. 21, 2006

(30) Foreign Application Priority Data

May 20, 2005    (JP)    ............................... 2005-148039

(51) Int. Cl.
*G01N 23/20*    (2006.01)
(52) U.S. Cl. ......................................... 378/71; 378/116
(58) Field of Classification Search .................. 378/96, 378/44, 116, 71, 80, 210
See application file for complete search history.

(56) References Cited

OTHER PUBLICATIONS

Elements of X-ray Diffraction, Second Edition, written by B.D. Cullity, Japanese Version, translated by G. Matsumura, published by Agune (Japan), 1980, pp. 179-183.
Elements of X-ray Diffraction, Second Edition, written by B.D. Cullit, Addison-Wesley Publishing Company, Inc. 1978, pp. 199-203.
Experimental Physics Course 20, X-ray Diffraction, edited by K. Kohra, published by Kyoritsu Shuppan (Japan), 1988, pp. 147-148 and 189, and its English translation of the related part.
Bonetto et al, "Measuring the Dead Time of an X-Ray Spectrometer by Means of the First- and Second-Order Reflections Method", X-Ray Spectrometry, vol. 13, No. 1, 1984, pp. 44-45.
Adams et al, "Deadtime of scintillation camera systems-definitions, measurement and applications", Medical Physics, vol. 1, No. 4, Jul./Aug. 1974, pp. 198-203.
Meray, L., "Measurement of the dead time of XRF Detection Systems Using a Pulsed Beam", X-Ray Spectrometry, vol. 17, Feb. 1988, pp. 19-21.

*Primary Examiner*—Hoon Song
(74) *Attorney, Agent, or Firm*—Frishauf, Holtz, Goodman & Chick, P.C.

(57) ABSTRACT

The dead time of a pulse type X-ray detector is measured without estimation of a true X-ray intensity. The first and the second conditions are used for varying an intensity of an X-ray entering the X-ray detector. The first condition may be the slit width of a receiving slit, at least three kinds of slit width being selected. The second condition may be with or without an absorption plate. The first observed X-ray intensities are observed, with the absorption plate inserted, for three or more values in slit width. Next, the second observed X-ray intensities are observed similarly but with the absorption plate removed. A predetermined relational expression is made up among the first observed X-ray intensity, the second observed X-ray intensity, a ratio k of the second observed X-ray intensity to the first observed X-ray intensity (depending upon attenuation in X-ray intensity caused by the absorption plate) and the dead time $\tau$ of the X-ray detector. Based on the relational expression, a fitting operation is carried out with the least squares method so as to determine the dead time $\tau$ precisely.

20 Claims, 10 Drawing Sheets

FIG. 1

$$I_{obs} = I_{tru} \exp(-\tau I_{tru}) \qquad (1)$$

$$I_{tru} = I_{obs} \exp(\tau I_{obs} \exp(\tau I_{obs} \exp(\ldots))) \qquad (2)$$

$$I_{tru} = I_{obs} \exp(\tau I_{obs} \exp(\tau I_{obs} \exp(\tau I_{obs}))) \qquad (3)$$

$$I_{tru} = f(\tau, I_{obs}) \qquad (4)$$

$$I_{obs1} = I_{tru1} \exp(-\tau I_{tru1}) \qquad (5)$$

$$I_{obs2} = I_{tru2} \exp(-\tau I_{tru2}) \qquad (6)$$

$$I_{tru2} = k I_{tru1} \qquad (7)$$

$$I_{obs2} = k I_{tru1} \exp(-\tau k I_{tru1}) \qquad (8)$$

$$I_{obs2} = k f(\tau, I_{obs1}) \exp(-\tau k f(\tau, I_{obs1})) \qquad (9)$$

FIG. 7

$$
\left.\begin{aligned}
I_{obs21} &= k\,f(\tau, I_{obs11})\exp(-\tau k\,f(\tau, I_{obs11})) \\
I_{obs22} &= k\,f(\tau, I_{obs12})\exp(-\tau k\,f(\tau, I_{obs12})) \\
I_{obs23} &= k\,f(\tau, I_{obs13})\exp(-\tau k\,f(\tau, I_{obs13})) \\
&\quad\vdots \\
I_{obs2n} &= k\,f(\tau, I_{obs1n})\exp(-\tau k\,f(\tau, I_{obs1n}))
\end{aligned}\right\} \quad (10)
$$

METHOD FOR MEASURING DEAD TIME OF X-RAY DETECTOR

BACKGROUND OF THE INVENTION

1. Field of the Invention

The present invention relates to a method for measuring the dead time of a pulse type X-ray detector.

2. Description of the Related Art

A pulse type X-ray detector, including for example a proportional counter, a scintillation counter and a solid-state detector such as an avalanche photo diode, can detect an X-ray intensity by counting the number of X-ray photons, i.e., particles. Accordingly, the pulse type X-ray detector has, in principle, the disadvantage of counting loss based on the finite dead time. When two X-ray photons enter the pulse type X-ray detector with a time interval smaller than the predetermined time, the two X-ray photons can not be observed separately but would be counted as one or less X-ray photon. The predetermined time described above has been referred to as the dead time. The dead time consists of a time inherent in a detecting device and another time comes from an electronic circuit such as a pulse height analyzer. The present application aims the dead time as viewed from the final output of the X-ray detector, i.e., the dead time in total of the X-ray detector.

There will now be explained a corrected expression of an X-ray detection intensity in consideration of the dead time. Equation (1) in FIG. 1 is a corrected expression of an X-ray detection intensity in an asphyxiant type X-ray detector which uses an amplifier. In equation (1), $I_{obs}$ indicates an X-ray intensity actually observed in the X-ray detector, $I_{tru}$ indicates a true X-ray intensity having entered the X-ray detector, and $\tau$ indicates the dead time. The unit of an X-ray intensity is the count number per unit of time, cps for example. FIG. 2 shows a graph of equation (1), $I_{tru}$ in abscissa and $I_{obs}$ in ordinate. A straight broken line 10 indicates that $I_{obs}$ is equal to $I_{tru}$, this is the ideal state without counting loss, which means that the dead time is zero. When with the finite dead time $\tau$, the shape of equation (1) becomes a mound curve, $I_{obs}$ becoming maximum when $I_{tru}$ is equal to $1/\tau$.

Equation (1) can be transformed so that $I_{tru}$ comes to the left side, resulting in equation (2) in FIG. 1. This equation (2) is used to obtain a true X-ray intensity $I_{tru}$ with the use of an observed X-ray intensity $I_{obs}$ and the dead time $\tau$. The nested structure of exp in equation (2) continues infinitely. In an actual calculation, however, the number of nesting may be cut off at the predetermined number. If the predetermined number is large enough, a true X-ray intensity is obtained with a sufficient accuracy. Equation (3) indicates an approximate equation in which the number of nesting is cut off at three.

FIG. 3 shows a graph indicating a variation of a calculated quantity of equation (2), i.e., a calculated true X-ray intensity $I_{tru}$, with the number of nesting, provided that the calculation is carried out with two hundred thousand cps in observed X-ray intensity $I_{obs}$ and $8 \times 10^{-7}$ seconds in dead time $\tau$. When the number of nesting is increased, the calculated quantity is convergent. As clearly seen from FIG. 3, about ten nesting would be sufficient because the good calculation result is obtained at ten nesting almost the same as that with the infinite nesting.

Therefore, if the number of nesting is large enough, a true X-ray intensity $I_{tru}$ can be determined with a sufficient accuracy based on equation (2) with the use of an observed X-ray intensity $I_{obs}$ and the dead time $\tau$.

If the dead time $\tau$ is known, a true X-ray intensity can be calculated with an observed X-ray intensity $I_{obs}$ as described. Then, it is important, in the counting loss correction, to determine the dead time $\tau$ precisely. The conventional methods for determining the dead time is disclosed in, for example, (1) Elements of X-ray Diffraction, Second Edition, written by B. D. Cullity, Japanese Version, translated by G. Matsumura, published by Agune (Japan), 1980, page 181 (which will be referred to as the first publication hereinafter) and (2) Experimental Physics Course 20, X-ray Diffraction, edited by K. Kohra, published by Kyoritsu Shuppan (Japan), 1988, pages 147-148 (which will be referred to as the second publication hereinafter).

The first publication discloses that (i) a plurality of metal foils having the same thickness are superimposed on one another to make an absorber, (ii) the absorber is inserted into the X-ray path, and (iii) X-ray intensities are detected with removing one metal foil after one detection. Plotting the number of the metal foils removed in abscissa while observed X-ray intensities (cps) in ordinate having a logarithmic scale, the logarithmic observed X-ray intensities are proportional to the removed numbers in a range of the smaller number of the removed metal foils, that is, in a range in which X-ray intensities are weak and thus there is almost no counting loss. On the other hand, when the removed number becomes larger, that is, in a range in which X-ray intensities become stronger and thus the counting loss is increased, the logarithmic observed X-ray intensities are out of proportional to the removed numbers. Taking account of such a plotted graph, it is understood how much X-ray intensity raises considerable counting loss. Extending the proportional relationship which is derived in the smaller X-ray intensity range, a true X-ray intensity may be estimated even in the larger X-ray intensity range. It would be possible to determine the dead time, based on equation (1), with the estimated true X-ray intensity and the observed X-ray intensity.

There has been known another method using the tube current of an X-ray tube, instead of using the number of the metal foils, to vary an X-ray intensity. The X-ray intensity of an X-ray tube is proportional to the tube current. Therefore, the dead time can be determined in a manner that (i) an X-ray intensity is detected with a small tube current, the observed X-ray intensity being almost equal to the true X-ray intensity, (ii) another X-ray intensity is detected with a large tube current enough to raise the counting loss, (iii) a true X-ray intensity with the large tube current is estimated based on the proportional relationship between the tube current and the true X-ray intensity and (iv) the dead time is determined using the estimated true X-ray intensity and the observed X-ray intensity.

Furthermore, the second publication introduces, as a method for determining the dead time experimentally, two books regarding the two-source method.

It is required, in the conventional methods, to estimate a true X-ray intensity by any means to determine the dead time experimentally. If the true X-ray intensity is determined based on the tube current as described above, there would occur problems described below. First, it takes about thirty minutes until the X-ray intensity becomes stable after change of the tube current. Further, it is not necessarily assured that an X-ray intensity entering the X-ray detector is actually proportional to the tube current. For example, since the change of the tube current raises the change of the focus position on the target, an X-ray intensity arriving at the X-ray detector is not necessarily proportional to the tube current. Especially, when an optical device such as a multilayer mirror is inserted between the X-ray source and the X-ray detector, an X-ray intensity entering the X-ray detector is definitely out of proportional to the tube current. Furthermore, it is necessary, for estimating a true X-ray intensity, to use an observed X-ray intensity which is obtained with a small tube current, and accordingly the resultant estimated high X-ray intensity would have a poor accuracy.

Even not using the tube current, as long as the dead time is determined based on the estimation of the true X-ray intensity by any means, the accuracy in determination of the dead time would depend on the accuracy in estimation of the true X-ray intensity.

SUMMARY OF THE INVENTION

It is an object of the present invention to provide a method for measuring the dead time of an X-ray detector without estimation of a true X-ray intensity, in a very short time, and with a high accuracy.

A method according to the present invention is for measuring a dead time of a pulse type X-ray detector and comprises the steps of: (a) adopting a first condition and a second condition, each of the two conditions having a feature that the condition has plural setting states which can be changed with one another so that a state of an X-ray path from an X-ray source to the X-ray detector can be altered so as to vary an intensity of an X-ray received in the X-ray detector; (b) adopting at least three setting states for the first condition; (c) adopting a first setting state and a second setting state for the second condition so that (c-1) the received X-ray intensity in the first setting state is different from the received X-ray intensity in the second setting state and (c-2) a ratio of the received X-ray intensity in the second setting state to the received X-ray intensity in the first setting state is constant in each of the at least three setting states of the first condition; (d) setting the first setting state for the second condition; (e) carrying out a first observing step in which an X-ray is emitted from the X-ray source and travels through the X-ray path and then is received in the X-ray detector so that an output of the X-ray detector is observed as a first observed X-ray intensity for each of the at least three setting states of the first condition; (f) changing the first setting state to the second setting state for the second condition; (g) carrying out a second observing step in which an X-ray is emitted from the X-ray source and travels through the X-ray path and then is received in the X-ray detector so that an output of the X-ray detector is observed as a second observed X-ray intensity for each of the at least three setting states of the first condition; and (h) determining the ratio and the dead time in a manner that (h-1) there is made up a relational expression defining a relationship among the first observed X-ray intensity, the second observed X-ray intensity, the ratio and the dead time for each of the at least three setting states of the first condition and (h-2) the ratio and the dead time are determined so that the relational expressions are most satisfied in total provided that the first observed X-ray intensity and the second observed X-ray intensity are handled as known while the ratio and the dead time are handled as unknown.

In the determining step (h) described above, if the ratio is known, only the dead time may be handled as unknown.

The first condition is preferably a variable which can be scanned smoothly and has a good repeatability. The second condition is so selected that the ratio of the received X-ray intensity in the second setting state to the received X-ray intensity in the first setting states becomes constant in any setting states of the first condition. It is also important that at least some part of combinations of the setting states of the first condition and the setting states of the second condition should provide a high X-ray intensity enough to raise the counting loss.

The number of the setting states of the first condition is three or more. More increased the number of the setting states, more improved the determination accuracy of the dead time. It is ascertained, by the inventors' experiment, that even with three setting states for the first condition, the difference between the calculated observed X-ray intensity which is determined with the least squares method according to the present invention and the actual observed X-ray intensity falls within five percent. Therefore, the present invention functions effectively even with three setting states for the first condition. It is preferable, however, that the number of the setting states for the first condition may be increased for a higher accuracy of the dead time, preferably not smaller than ten, more preferably not smaller than a hundred.

The first condition may be a state of a slit arranged in the X-ray path, and the second condition may be with or without an absorption plate inserted into the X-ray path. A variation of the state of the slit may be a variation of a slit width of a receiving slit, a transverse movement of a receiving slit with a constant slit width, a variation of a slit width of a divergence slit, or a transverse movement of a divergence slit with a constant slit width.

Further, the rocking curve of the diffraction peak of a perfect crystal may be used to measure the dead time. In this case, the first condition may be a variation in angle of any rotation in the diffraction optical path, and the second condition may be with or without an absorption plate inserted into the X-ray path. The any rotation in the diffraction optical path may be a $2\theta$-rotation which rotates the X-ray detector, or an $\omega$-rotation which rotates the perfect crystal.

Summarizing the present invention described above, there are used combinations of at least three setting states for the first condition and the two setting states for the second condition to obtain relatively many observed X-ray intensities, and optimization is performed, based on the predetermined relational expressions, with the fitting operation using, for example, the least squares method to determine the dead time precisely. As a result, the dead time can be measured without estimation of a true X-ray intensity, in a very short time, and with a high accuracy.

BRIEF DESCRIPTION OF THE DRAWINGS

FIG. 1 shows equations (1) through (9) used for explaining the principle of the present invention;

FIG. 7 shows equations (10) which are used for explaining the principle of the present invention;

DETAILED DESCRIPTION OF THE PREFERRED EMBODIMENTS

Figure 2:
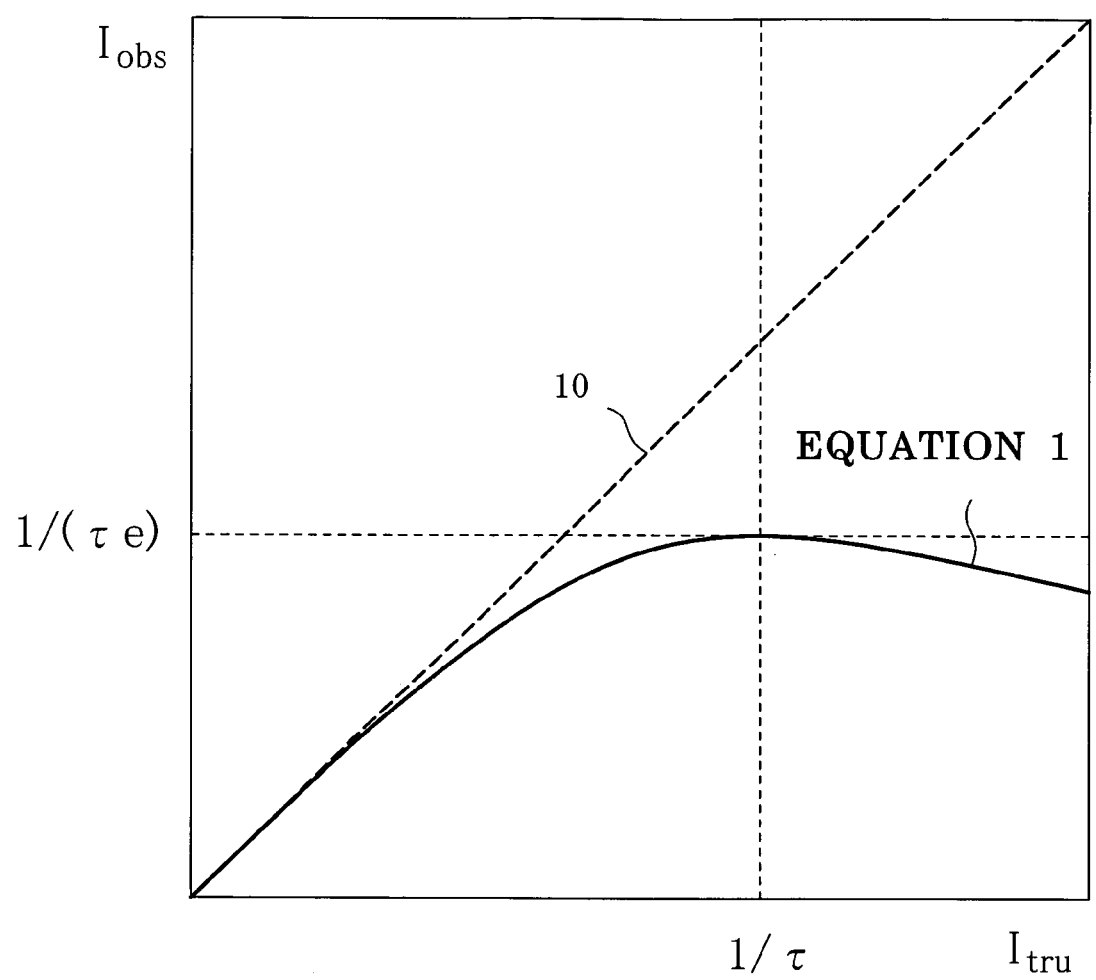
FIG. 2 shows a graph of equation (1)
Figure 3:
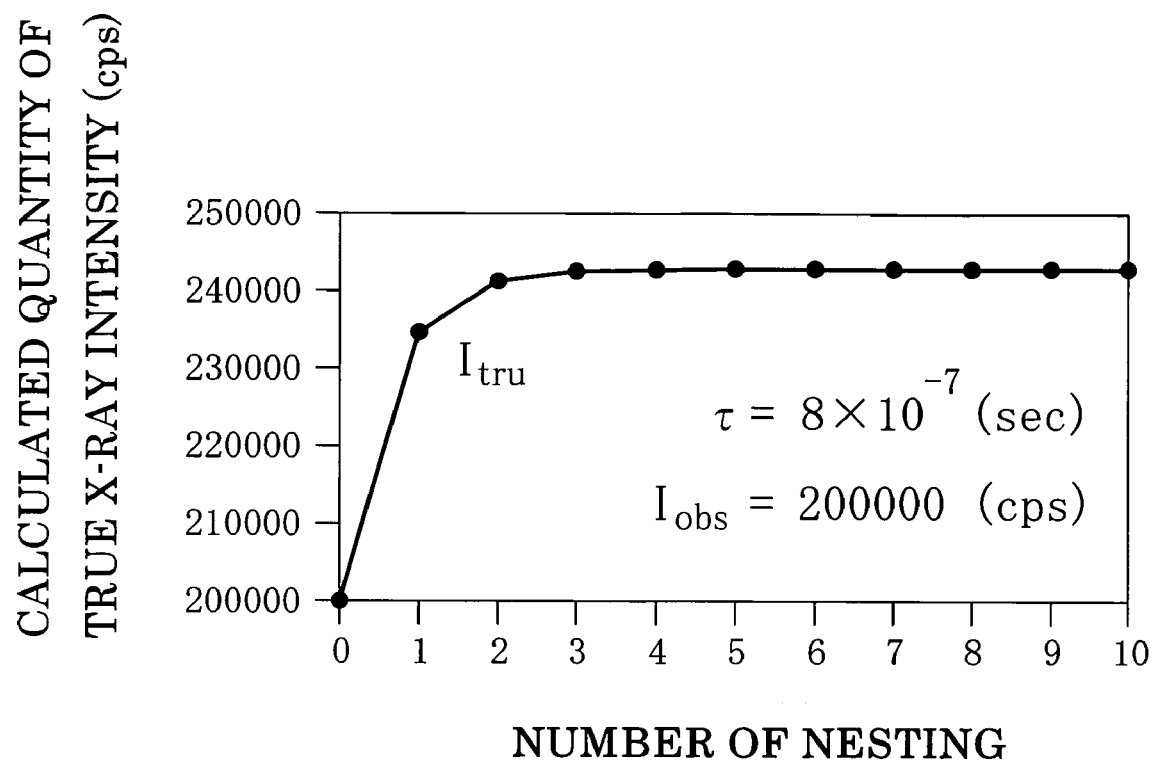
FIG. 3 shows a graph indicating a variation of a calculated true X-ray intensity with the number of nesting in equation (2)

Embodiments of the present invention will now be described in detail below with reference to the drawings. First of all, the principle of the present invention will be described. Equation (1) in FIG. 1 is, as having been described above, a corrected expression of an X-ray detection intensity in an asphyxiant type X-ray detector which uses an amplifier. Equation (1) is transformed to give equation (2), which is used to obtain a true X-ray intensity $I_{tru}$ with the use of an observed X-ray intensity $I_{obs}$ and the dead time τ. The right side of equation (2) is a function of the observed X-ray intensity $I_{obs}$ and the dead time τ. Then, assuming that the function form is expressed by f, equation (2) may be replaced by equation (4).

The present invention observes an X-ray intensity with the X-ray detector for determining the dead time, and the observation process uses the first condition and the second condition. The first condition has at least three setting states, preferably not smaller than ten setting states, more preferably about a hundred setting states if possible. On the other hand, the second condition has two setting states. An observed X-ray intensity in the first setting state of the second condition will be referred to as the first observed X-ray intensity, and is expressed by $I_{obs1}$. Similarly, an observed X-ray intensity in the second setting state of the second condition will be referred to as the second observed X-ray intensity, and is expressed by $I_{obs2}$. The first true X-ray intensity corresponding to the first observed X-ray intensity $I_{obs1}$ is expressed by $I_{tru1}$, while the second true X-ray intensity corresponding to the second observed X-ray intensity $I_{obs2}$ is expressed by $I_{tru2}$. The first observed X-ray intensity $I_{obs}$ and the first true X-ray intensity $I_{tru1}$ have a relationship expressed by equation (5), similar to equation (1). Similarly, the second observed X-ray intensity $I_{obs2}$ and the second true X-ray intensity $I_{tru2}$ have a relationship expressed by equation (6).

The second true X-ray intensity $I_{tru2}$ is, as indicated by equation (7), proportional to the first true X-ray intensity $I_{tru1}$, the ratio of the former to the latter being expressed by k. The ratio k is constant in any setting states of the first condition. In other words, the two setting states of the second condition are selected so that the ratio k is constant in any setting states of the first condition. This feature is important in the present invention.

By combining equations 6 and 7, the second true X-ray intensity $I_{tru2}$ disappears and accordingly equation (6) becomes equation (8). By transforming the first true X-ray intensity $I_{tru1}$ in equation (8) to the first observed X-ray intensity $I_{obs1}$ with the use of equation (4), equation (8) becomes equation (9) which is the predetermined relational expression in the present invention. Equation (9) is a relational expression defining a relationship between the four items: the first observed X-ray intensity $I_{obs1}$, the second observed X-ray intensity $I_{obs2}$, the ratio K, and the dead time τ. The first observed X-ray intensity $I_{obs}$, and the second observed X-ray intensity $I_{obs2}$ are actually observed quantities and thus are known. On the other hand, the ratio k and the dead time τ are unknown and can be determined at the same time by the process described below. As a result, the dead time τ can be determined precisely.

Figure 4:
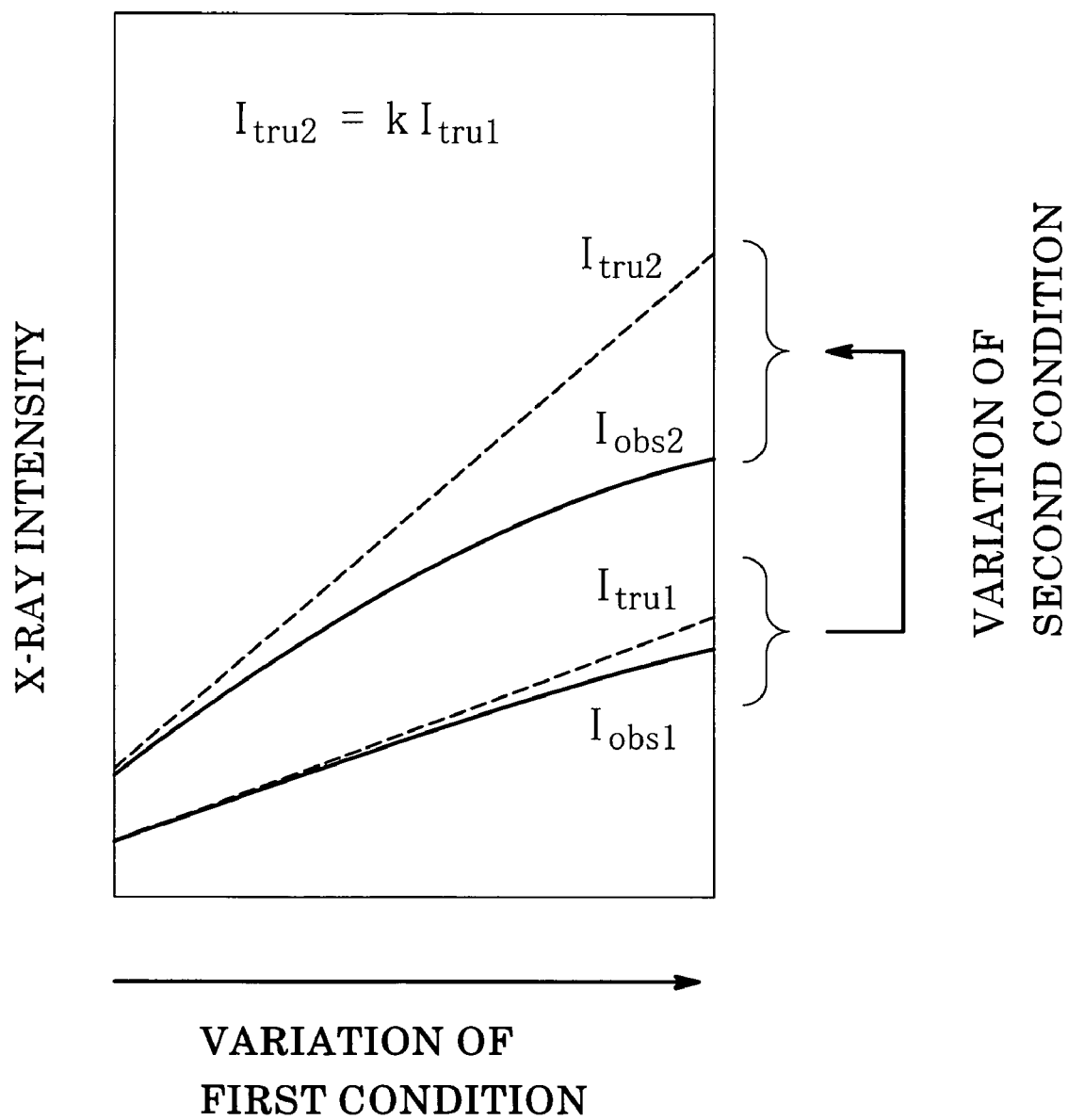
FIG. 4 shows a graph indicating schematically a variation of the first condition, a variation of the second condition, and a variation of an X-ray intensity therewith.

FIG. 4 shows a graph indicating schematically a variation of the first condition, a variation of the second condition, and a variation of an X-ray intensity therewith. When the second condition is set to the first setting state and X-ray intensities are observed by the X-ray detector with variation of the first condition, a series of the first observed X-ray intensities $I_{obs1}$ are obtained. The first observed X-ray intensity $I_{obs1}$ and the corresponding first true X-ray intensity $I_{tru1}$ would vary as shown in FIG. 4. Next, the first setting state of the second condition is changed to the second setting state, and then, similar to in the first setting state, X-ray intensities are observed by the X-ray detector with variation of the first condition, the second observed X-ray intensities $I_{obs2}$ being obtained. The second observed X-ray intensity $I_{obs2}$ and the corresponding second true X-ray intensity $I_{tru2}$ would vary as shown also in FIG. 4. The X-ray intensity is higher in the second setting state of the second condition than in the first setting state, and accordingly, the effect of the counting loss is stronger in the second observed X-ray intensity $I_{obs2}$. As a result, the second observed X-ray intensity $I_{obs2}$ is apart from the second true X-ray intensity $I_{tru2}$ farther than in the first observed X-ray intensity $I_{obs1}$. It is important, in the present invention, that at least some part of combinations of the setting states of the first condition and the setting states of the second condition should provide a high X-ray intensity enough to raise the remarkable counting loss as shown in FIG. 4.

Figure 5A:
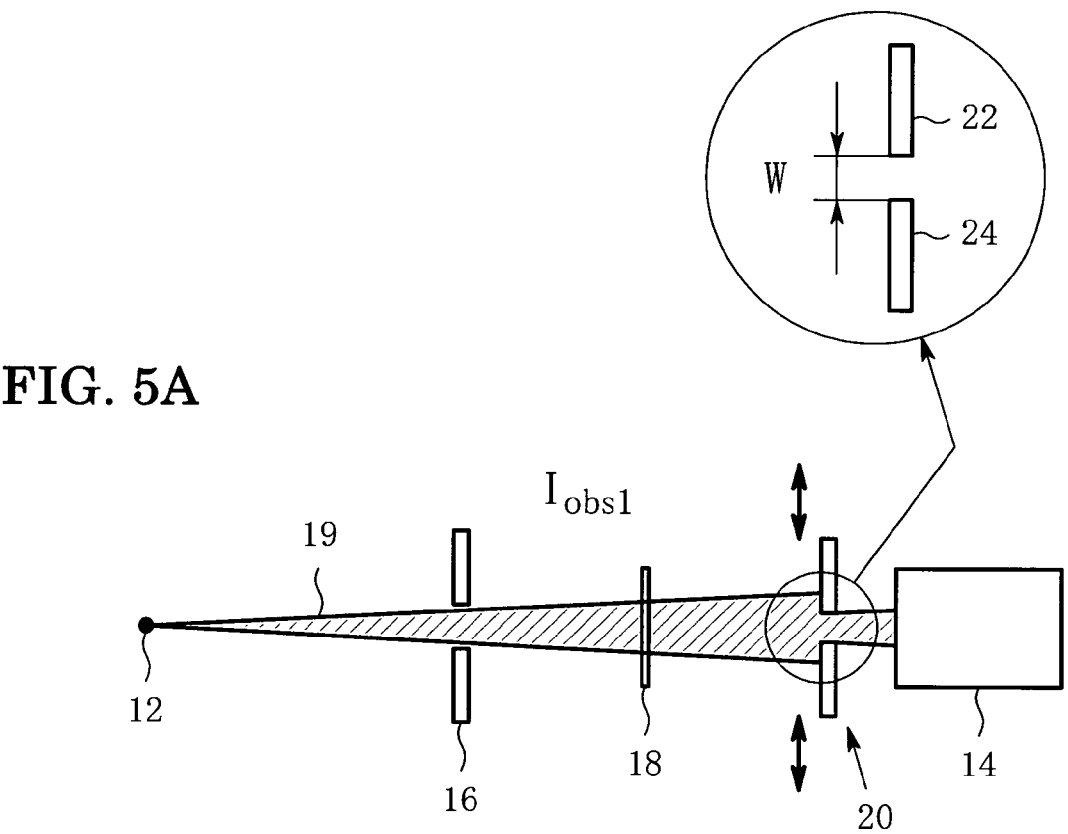
FIGS. 5A and 5B are plan views of an X-ray optical system for performing the method according to the present invention.
Figure 5B:
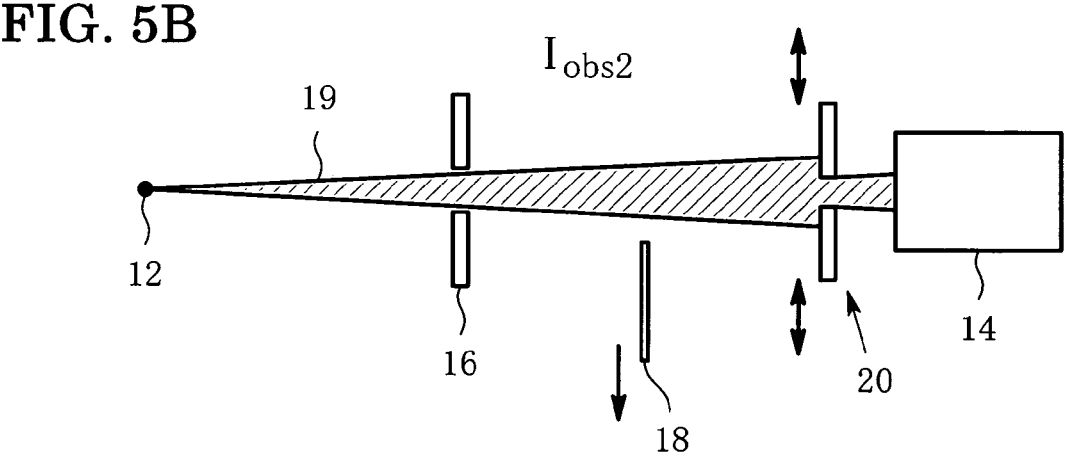

An example of the optical system for performing the present invention will now be described with the specific first and second conditions. FIGS. 5A and 5B are plan views of an X-ray optical system for performing the method according to the present invention. In this optical system, the second condition is with or without an absorption plate, while the first condition is a variation of the slit width of a receiving slit. Referring to FIG. 5A, the optical system has an X-ray source 12 and an X-ray detector 14, and there are arranged therebetween a divergence slit 16, an absorption plate 18 and a receiving slit 20. The divergence slit 16 regulates a divergence angle of an X-ray beam 19 from the X-ray source 12 and prevents unwanted scattered X-rays from entering an X-ray detecting system. The absorption plate 18 may be inserted into the X-ray path or may be removed from the X-ray path. The receiving slit 20 consists of two slit blades 22 and 24, each of which can move in a direction perpendicular to the X-ray path, i.e., in an up-and-down direction in FIG. 5A. The distance between the two slit blades 22 and 24 is a slit width W. In the optical system, the two slit blades 22 and 24 can move in opposite directions with an interlocking motion, so that the slit width W can be wider or narrower symmetrically. A variation of the slit width W corresponds to a variation of the setting state of the first condition in the present invention. A state in which the absorption plate 18 is inserted into the X-ray path, i.e., the state shown in FIG. 5A, corresponds to the first setting state of the second condition. On the other hand, another state in which the absorption plate 18 is removed from the X-ray path, i.e., the state shown in FIG. 5B, corresponds to the second setting state of the second condition. When the absorption plate 18 is inserted into the X-ray path, an X-ray is partly absorbed by the absorption plate 18 so that the X-ray intensity is attenuated. By passing through the absorption plate 18, the X-ray intensity is attenuated to 1/k, noting that k corresponds to the "ratio of the received X-ray intensity in the second setting state to the received X-ray intensity in the first setting state" in the present invention.

Referring to FIG. 5A, the absorption plate 18 is inserted into the X-ray path, and then a series of the first observed X-ray intensities $I_{obs1}$ are observed with the X-ray detector 14 as described below. The slit width W is changed from W1 to Wn with an interval of ΔW, and a series of the first observed X-ray intensities $I_{obs11}$ to $I_{obs1n}$ are observed with the n-kinds of slit widths. Next, as shown in FIG. 5B, the absorption plate 18 is removed from the X-ray path, and then a series of the second observed X-ray intensities $I_{obs2}$ are observed with the X-ray detector 14. Similarly to the first observation step, the slit width W is changed from W1 to Wn with an interval of ΔW, and a series of the second observed X-ray intensities $I_{obs21}$ to $I_{obs2n}$ are observed with the n-kinds of slit widths. Such an observation process is schematically shown in a graph in FIG. 6. A variation of the slit width W is in abscissa, varying as W1, W2, W3, . . . , Wn, noting that actually the slit width varies continuously and the X-ray intensities are observed with the predetermined interval of ΔW. An observed X-ray intensity is in ordinate. The first observed X-ray intensities are observed as $I_{obs11}$, $I_{obs12}$, $I_{obs13}$, . . . , $I_{obs1n}$, and the second observed X-ray intensities are observed as $I_{obs21}$, $I_{obs22}$, $I_{obs23}$, . . . , $I_{obs2n}$.

Figure 6:
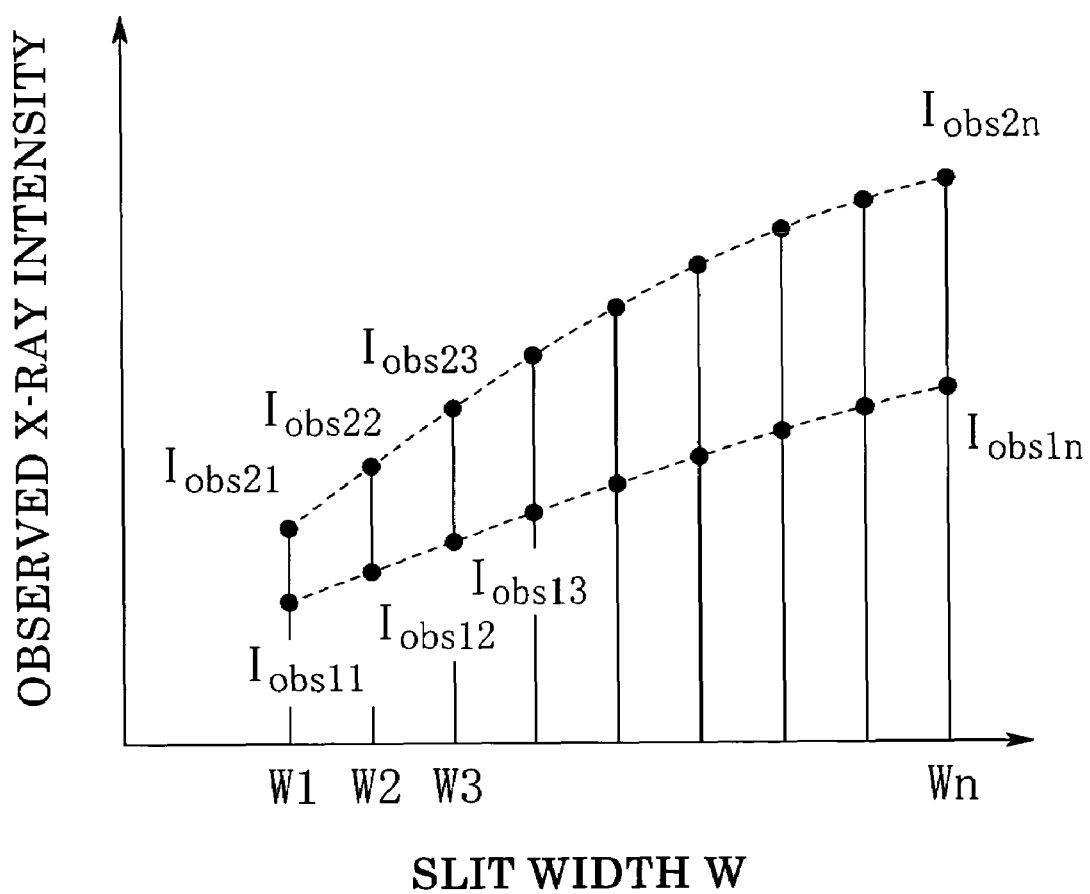
FIG. 6 shows a graph indicating schematically an observation process for X-ray intensity with variations of the first and second conditions.

In FIG. 6, repeatability of the slit width W is important. For example, the present invention is based on the premise that the slit width W1 with which $I_{obs11}$ is observed is equal to the slit width W1 with which $I_{obs21}$ is observed. In this regard, the X-ray diffraction apparatus used in the present invention has 0.5 micrometer in minimum resolution of the slit width of the receiving slit, and keeps the repeatability of the slit width control at least the same as the minimum resolution.

With the observed X-ray intensities obtained described above, n-kinds of relational expressions can be made up as shown in equations (10) in FIG. 7. The ratio k and the dead time τ are determined so that the equations (10) are most satisfied in total. The least squares method may be used to determine most probable k and τ based on the equations (10). That is, (i) k and τ are assumed by trial and error, (ii) the difference between the right side and the left side is calculated for each of the respective equations (10) with the assumed k and τ, (iii) each difference is raised to the second power, (iv) sum of the squares is calculated, and (v) k and τ are determined so that the sum of the squares becomes minimum.

Figure 8:
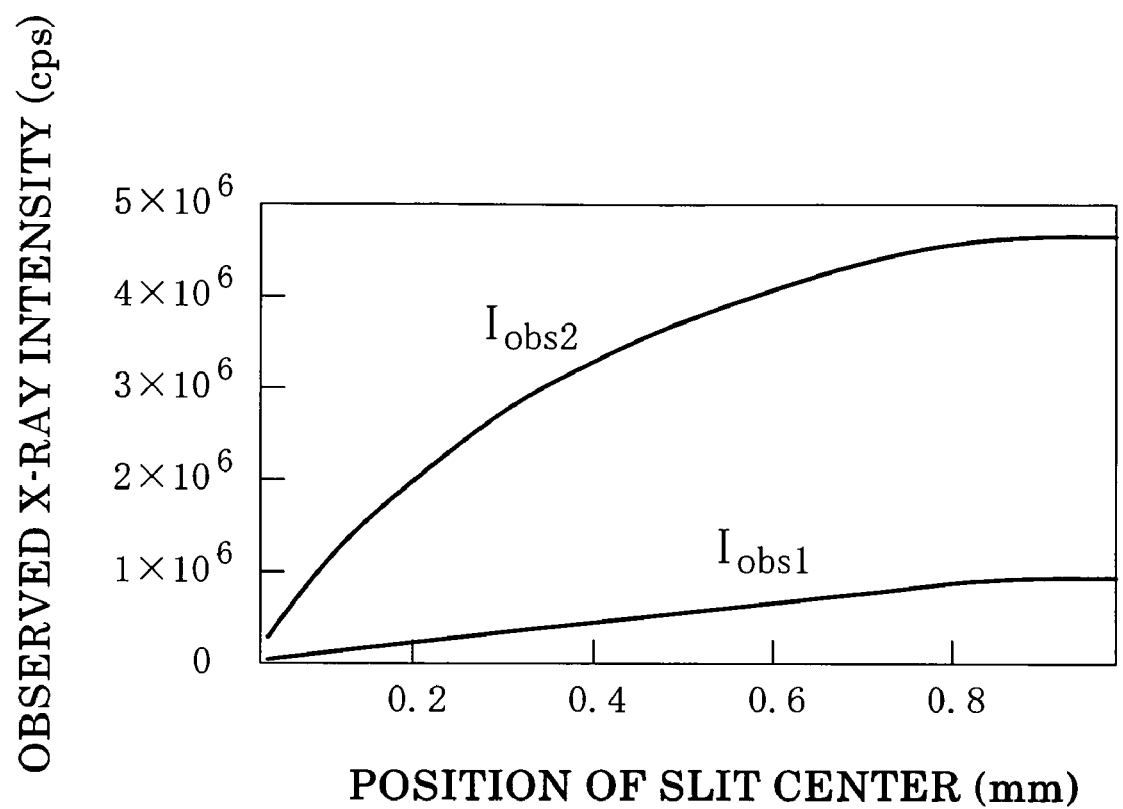
FIG. 8 shows a graph indicating the actually-detected first observed X-ray intensity $I_{obs1}$ and the actually-detected second observed X-ray intensity $I_{obs2}$.

FIG. 8 shows a graph indicating the actually-detected first observed X-ray intensity $I_{obs1}$ and the actually-detected second observed X-ray intensity $I_{obs2}$. The graph is obtained in a manner described below. An optical system used is similar to that shown in FIG. 5A, provided that a multilayer mirror and a four-crystal monochromator made of Ge (220) crystal are inserted between the X-ray source 12 and the divergence slit 16. The X-ray source 12 is a CuKα ray. The absorption plate 18 is an aluminum plate which is 0.1 mm in thickness. The X-ray detector 14 is a scintillation counter. The first condition is not a variation of the slit width W of the receiving slit 20 but a variation of the position of the receiving slit 20, i.e., a transverse movement. In this regards, the whole of the receiving slit 20 is moved continuously in a bottom-to-top direction in FIG. 5A so that the center of the receiving slit 20, i.e., the center of the slit width W, varies within a range between zero and one millimeter, the time required for the movement being about one minute. It is noted that the origin of the center of the receiving slit 20 is a position at which an X-ray intensity detected by the X-ray detector 14 becomes almost zero. In the experiment, X-ray intensities were observed with an interval of four micrometers in moving distance of the receiving slit 20, resulting in about 240 kinds of observed X-ray intensities. Then, about 240 kinds of relational expressions were made up as shown in equations (10) in FIG. 7, and a fitting operation was performed in a manner that the ratio k and the dead time τ were precisely determined, with the least squares method, so that calculated quantities derived from the relational expressions approached best the graph shown in FIG. 8. It took only about one second, with a computer, to make calculations required for the fitting operation with the least squares method. It should be noted that the number of nesting of exp in equation (2) in FIG. 1 was cut off at twenty in the calculations. The resultant ratio k was 10.32 and the resultant dead time τ was $7.7 \times 10^{-7}$ second. The difference between the observed X-ray intensity and the calculated quantity in the most fitted state was within one percent for each observed point. Thus, the fitting operation with the least squares method can determine the dead time precisely and can also provide the difference in the fitting, with which the accuracy of the dead time can be verified.

As clearly seen from the experiment described above, it takes only about one minute to obtain 240 kinds of the first observed X-ray intensities, and similarly it takes about one more minute for the second X-ray intensities. Accordingly, the method according to the present invention can determine the dead time precisely in a very short time as compared with the conventional method which uses the estimated true X-ray intensity based on the tube current, noting that it takes about thirty minutes until the tube current becomes stable. Since the fitting operation with the least squares method is carried out based on the many observed X-ray intensities, accuracy in observed X-ray intensity at one observing point would not affect the result. Therefore, even if about 240 kinds of the observed X-ray intensities are obtained in one minute as described above, the dead time is determined with a high accuracy.

Although, in the embodiment described above, the second condition is with or without the absorption plate and the first condition is a variation of the slit width of the receiving slit or a transverse movement of the receiving slit, the present invention is not limited to the specific condition setting but may adopt various types of condition setting. Modifications of the condition setting will be described below.

Figure 9A:
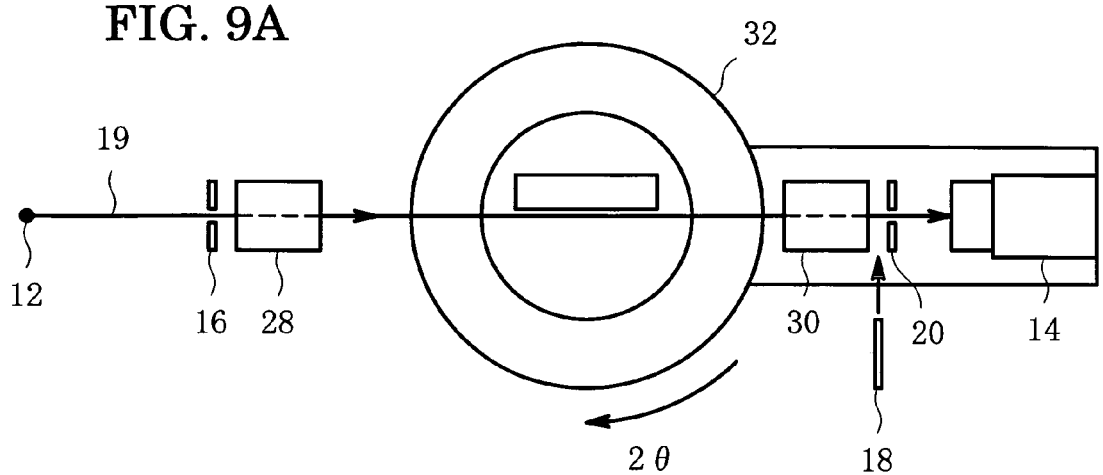
FIGS. 9A and 9B are plan views of the X-ray optical system of an X-ray diffractometer.

FIG. 9A is a plan view of the X-ray optical system of the standard X-ray diffractometer. The plan view shows a state in which an X-ray beam 19 from an X-ray source 12 is detected directly by an X-ray detector 14. The X-ray beam 19 is emitted from the X-ray source 12, and passes through a divergence slit 16, an incident Soller slit 28, a receiving Sollet slit 30 and a receiving slit 20, and then reaches the X-ray detector 14. The X-ray detector 14, the receiving Soller slit 30 and the receiving slit 20 can rotate with a 2θ-rotation along with a 2θ-turntable 32. When the X-ray detector 14 is brought to the position at which 2θ is equal to zero, the direct beam from the X-ray source 12 is detected. In this position, if the absorption plate 18 is inserted into or removed from the incident-side of the receiving slit 20, there is realized the optical system shown in FIGS. 5A and 5B. In this case, the second condition is an inserted state or a removed state of the absorption plate 18, i.e., with or without the absorption plate 18. The first condition is a variation of the slit width of the receiving slit 20.

Modifications of the first condition, in the case that the second condition is with or without the absorption plate, may be the transverse movement of the receiving slit which has been described with reference to FIG. 8, or may be the following. The receiving slit 20 may be constant in state while the divergence slit 16 may vary in state. Namely, the slit width of the divergence slit 16 may vary or the divergence slit 16 is moved in a direction perpendicular to the X-ray path with a constant slit width. Further, the first condition may be a variation in angle of the 2θ-rotation of the 2θ-turntable 32 without change in state of the slit members. In this case, when the angle of the 2θ-rotation varies, the position of the receiving slit 20 and the position of the X-ray detector 14 vary with respect to the X-ray beam 19, so that the observed X-ray intensity varies.

Figure 10A:
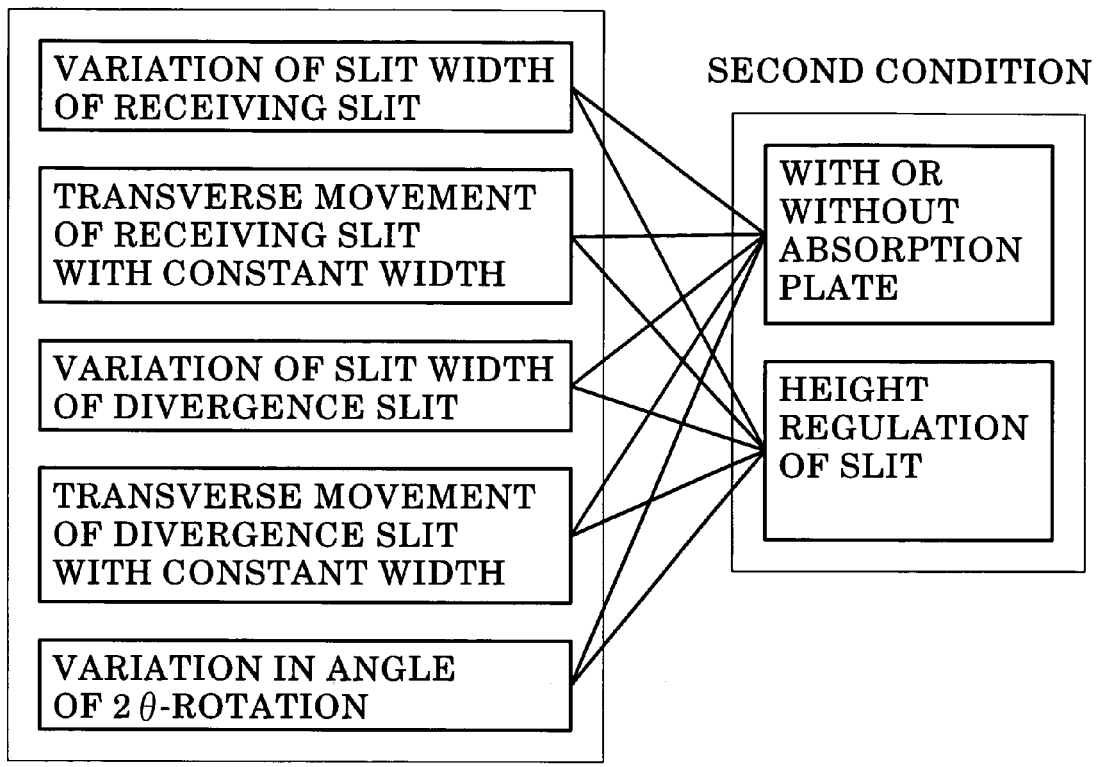
FIGS. 10A and 10B show possible combinations of the first condition and the second condition.

Modifications of the second condition may be height regulation of any one of the slit members instead of with or without the absorption plate. For example, a part of the height of the incident Soller slit 28 or the receiving Soller slit 30 may be closed or opened, noting that the height direction is a direction perpendicular to the drawing sheet. Alternatively, the divergence slit 16 or the receiving slit 20 may be under the height regulation. It should be noted that the height regulation is applicable to the case in which the cross section of the X-ray beam 19 extends long in a direction perpendicular to the drawing sheet in FIG. 5A. When the height regulation of any one of the slit members is adopted as the second condition, the first condition may be all of the modifications described above. A list of possible combinations of the first and second conditions are shown in FIG. 10A, any combination with a connecting line between one of the first conditions and one of the second conditions being a possible combination.

Figure 9B:
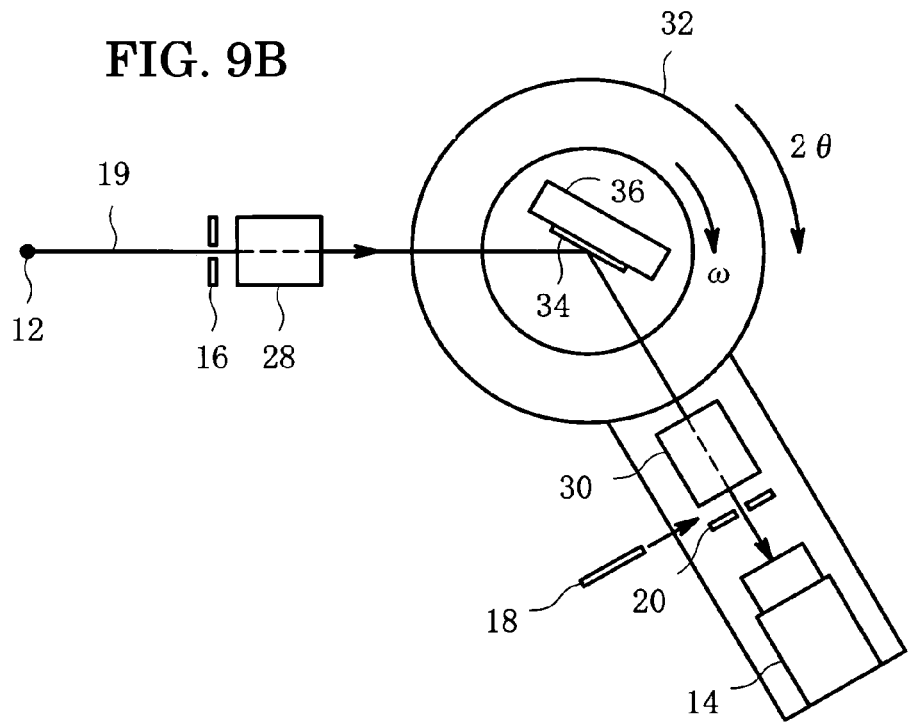
Figure 10B:
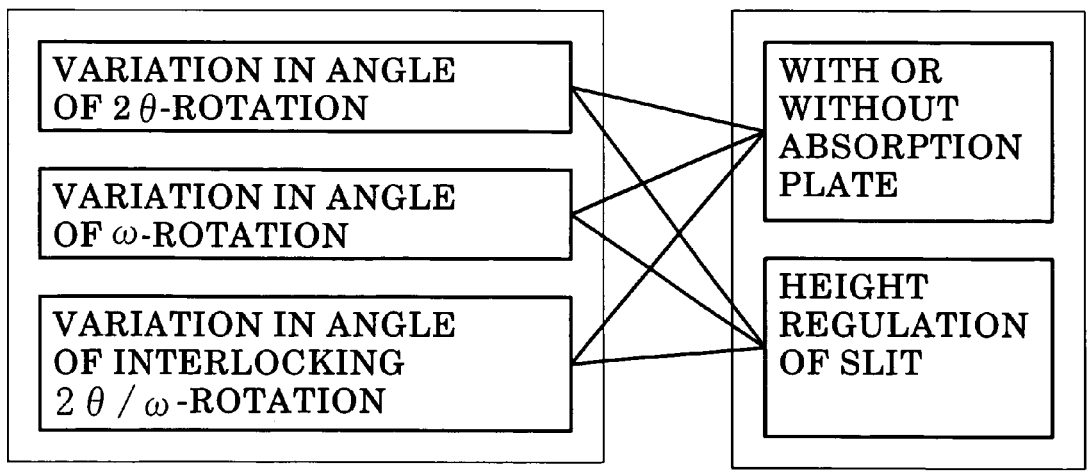

The method according to the present invention may use the rocking curve of a diffraction peak of the perfect crystal. FIG. 9B is a plan view showing a condition in which a sample 34 made of the perfect crystal is mounted on a sample holder 36 to measure a rocking curve of the sample 34. Even with such a diffraction measurement, it is possible to determine the dead time according to the present invention. Stating in detail, a rotation angle ω of the sample holder 36 and a rotation angle 2θ of the 2θ-turntable 32 are set so that the specific diffraction peak of the perfect crystal sample 34 can be detected by the X-ray detector 14, and then the rotation angle 2θ of the 2θ-turntable 32 is scanned. As a result, an observed X-ray intensity varies with the rocking curve of the diffraction peak of the perfect crystal. Such a 2θ-scanning may be adopted as the first condition in the present invention. The second condition may be with or without the absorption plate 18, or the height regulation of any one of the slit members. Instead of the 2θ-scanning, there may be adopted an ω-scanning of the sample holder 36, or an interlocking 2θ/ω-scanning, i.e., 2θ: ω=2:1, of the 2θ-turntable 32 and the sample holder 36. A list of such combinations is shown in FIG. 10B.

As seen from the embodiments shown in FIGS. 9A and 9B, the method according to the present invention can be performed, to determine the dead time, with the use of the X-ray optical system of the ordinary X-ray diffraction apparatus with almost no alterations, i.e., with the use of the movement mechanism of the slit and the rotational mechanism of the goniometer as they are.

Although, in the embodiments described above, the ratio k is handled as unknown to determine the ratio k and the dead time τ, the ratio k may be handled as known in the present invention. For example, when the second condition is with or without the absorption plate, the attenuation rate in X-ray intensity by the absorption plate can be calculated with a high accuracy if the X-ray wavelength used is known and the material and the thickness of the absorption plate are known. The inverse number of such an attenuation rate may be used as the ratio k. In this case, only the dead time τ should be determined with the least squares method. Even in the case of the height regulation of any one of the slit members instead of the absorption plate, the ratio k may be handled as known, if it is known, to determine the dead time τ.

Although, in the embodiments described above, the corrected expression of the observed X-ray intensity with the counting loss has the function form shown in equation (1), the present invention is not limited to the specific function form. Any function form may be used in the present invention provided that a true X-ray intensity $I_{tru}$ is calculated with the use of the dead time τ and an observed X-ray intensity $I_{obs}$.

What is claimed is:

1. A method for measuring a dead time of a pulse type X-ray detector comprising:
    adopting a first condition and a second condition, each of the two conditions having a feature that the condition has plural setting states which can be changed with one another so that a state of an X-ray path from an X-ray source to the X-ray detector can be altered so as to vary an intensity of an X-ray received in the X-ray detector;
    adopting at least three setting states for the first condition;
    adopting a first setting state and a second setting state for the second condition so that:
        the received X-ray intensity in the first setting state is different from the received X-ray intensity in the second setting state, and
        a ratio of the received X-ray intensity in the second setting state to the received X-ray intensity in the first setting state is constant in each of the at least three setting states of the first condition;
    setting the first setting state for the second condition;
    carrying out a first observation in which the X-ray is emitted from the X-ray source and travels through the X-ray path and then is received in the X-ray detector so that an output of the X-ray detector is observed as a first observed X-ray intensity for each of the at least three setting states of the first condition;
    changing the first setting state to the second setting state for the second condition;
    carrying out a second observation in which the X-ray is emitted from the X-ray source and travels through the X-ray path and then is received in the X-ray detector so that an output of the X-ray detector is observed as a second observed X-ray intensity for each of the at least three setting states of the first condition;
    determining the ratio and the dead time in a manner that:
        there is made up a relational expression defining a relationship among the first observed X-ray intensity, the second observed X-ray intensity, the ratio and the dead time for each of the at least three setting states of the first condition, and
        the ratio and the dead time are determined so that the relational expressions are most satisfied in total provided that the first observed X-ray intensity and the second observed X-ray intensity are handled as known while the ratio and the dead time are handled as unknown; and
    storing the determined dead time in a storage device.

2. A method according to claim 1, wherein the first condition comprises a state of a slit arranged in the X-ray path, and the second condition comprises a state of insertion of an absorption plate into the X-ray path.

3. A method according to claim 2, wherein the first condition is a variation of a slit width of a receiving slit arranged in the X-ray path.

4. A method according to claim 2, wherein the first condition is a transverse movement, with a constant slit width, of a receiving slit arranged in the X-ray path.

5. A method according to claim 2, wherein the first condition is a variation of a slit width of a divergence slit arranged in the X-ray path.

6. A method according to claim 2, wherein the first condition is a transverse movement, with a constant slit width, of a divergence slit arranged in the X-ray path.

7. A method according to claim 1, wherein the X-ray path belongs to a diffraction optical system for detection of a diffracted X-ray from a perfect crystal, the first condition comprises a variation in angle of any rotation in the diffraction optical system, and the second condition comprises a state of insertion of an absorption plate into the X-ray path.

8. A method according to claim 7, wherein the variation in angle is a variation in angle of a 2θ-rotation which rotates the X-ray detector.

9. A method according to claim 7, wherein the variation in angle is a variation in angle of an ω-rotation which rotates the perfect crystal.

10. A method according to claim 1, wherein at least ten setting states are adopted for the first condition.

11. A method for measuring a dead time of a pulse type X-ray detector comprising:
adopting a first condition and a second condition, each of the two conditions having a feature that the condition has plural setting states which can be changed with one another so that a state of an X-ray path from an X-ray source to the X-ray detector can be altered so as to vary an intensity of an X-ray received in the X-ray detector;
adopting at least three setting states for the first condition;
adopting a first setting state and a second setting state for the second condition so that:
the received X-ray intensity in the first setting state is different from the received X-ray intensity in the second setting state, and
a ratio of the received X-ray intensity in the second setting state to the received X-ray intensity in the first setting state is constant in each of the at least three setting states of the first condition;
setting the first setting state for the second condition;
carrying out a first observation in which the X-ray is emitted from the X-ray source and travels through the X-ray path and then is received in the X-ray detector so that an output of the X-ray detector is observed as a first observed X-ray intensity for each of the at least three setting states of the first condition;
changing the first setting state to the second setting state for the second condition;
carrying out a second observation in which the X-ray is emitted from the X-ray source and travels through the X-ray path and then is received in the X-ray detector so that an output of the X-ray detector is observed as a second observed X-ray intensity for each of the at least three setting states of the first condition;
determining the ratio and the dead time in a manner that:
there is made up a relational expression defining a relationship among the first observed X-ray intensity, the second observed X-ray intensity, the ratio and the dead time for each of the at least three setting states of the first condition, and
the ratio and the dead time are determined so that the relational expressions are most satisfied in total provided that the first observed X-ray intensity, the second observed X-ray intensity and the ratio are handled as known while the dead time is handled as unknown; and
storing the determined dead time in a storage device.

12. A method according to claim 11, wherein the first condition comprises a state of a slit arranged in the X-ray path, and the second condition comprises a state of insertion of an absorption plate into the X-ray path.

13. A method according to claim 12, wherein the first condition is a variation of a slit width of a receiving slit arranged in the X-ray path.

14. A method according to claim 12, wherein the first condition is a transverse movement, with a constant slit width, of a receiving slit arranged in the X-ray path.

15. A method according to claim 12, wherein the first condition is a variation of a slit width of a divergence slit arranged in the X-ray path.

16. A method according to claim 12, wherein the first condition is a transverse movement, with a constant slit width, of a divergence slit arranged in the X-ray path.

17. A method according to claim 11, wherein the X-ray path belongs to a diffraction optical system for detection of a diffracted X-ray from a perfect crystal, the first condition comprises a variation in angle of any rotation in the diffraction optical system X-ray path, and the second condition comprises a state of insertion of an absorption plate into the X-ray path.

18. A method according to claim 17, wherein the variation in angle is a variation in angle of a 2θ-rotation which rotates the X-ray detector.

19. A method according to claim 17, wherein the variation in angle is a variation in angle of an ω-rotation which rotates the perfect crystal.

20. A method according to claim 11, wherein at least ten setting states are adopted for the first condition.

* * * * *